United States Patent Office 3,514,270
Patented May 26, 1970

3,514,270
MANUFACTURE OF BISMUTH MAGNESIUM
ALUMINOSILICATE
Teizaburo Tomita, Naruto-shi, Japan, assignor to Tomita
Pharmaceutical Co., Ltd., Naruto-shi, Tokushima-ken,
Japan
No Drawing. Filed June 9, 1967, Ser. No. 644,772
Claims priority, application Japan, June 10, 1966,
41/37,670, 41/37,671
Int. Cl. C01f 57/00, 2/02
U.S. Cl. 23—315    8 Claims

ABSTRACT OF THE DISCLOSURE

Bismuth magnesium aluminosilicate is manufactured by adding with stirring at 5–60° C. an acidic solution of a bismuth salt dissolved in an inorganic acid of less than pH 2 to an alkaline aqueous slurry of a magnesium aluminate of pH 8–12 in such a ratio that the mixture retains a pH 8–10.5 and molar ratio of $Al_2O_3:Bi_2O_3$ is in the range of 1:0.03–1:0.1, further adding with stirring at 5–60° C. to the resultant aqueous slurry an aqueous solution of a silicate in a molar ratio of $Al_2O_3:SiO_2$ between 1:0.3 and 1:3, and separating the resultant bismuth magnesium aluminosilicate from the mother liquid.

This invention relates to a process for manufacturing medicines, particularly bismuth magnesium aluminosilicate which is useful as an antacid.

Magnesium aluminosilicate has been widely used as an antacid in the past. This compound exhibits prolonged excellent antacidic action and non-absorptive property through alimentary tract without acid rebound or diarrhea or constipation. However, this compound can merely neutralize gastric juice, and it has been taken up seriously in the recent years to impart protective action for stomach walls in addition to antacidic action.

To meet the above requirement, the manufacture of bismuth magnesium aluminosilicate by reacting magnesium aluminosilicate with bismuth salt was proposed (Japanese patent publication No. 14704/1963). This publicly known process comprises reacting magnesium aluminosilicate with bismuth salt in the presence of an organic solvent, and the use of organic solvent is considered to be indispensable to prevent undesirable reaction of bismuth salt with water. For example, by the reaction of bismuth nitrate with water there is produced a white precipitate of bismuth oxynitrate $(Bi(OH)_2NO_3)$ having no reactivity with magnesium aluminosilicate. According to this method relatively costly organic solvent such as methanol, ethanol, acetone and the like has to be used against economical purposes, and recovery of the solvent necessitates complicated operation, and furthermore, magnesium aluminosilicate in this method is first produced in dried powder form and then reacted with bismuth salt, preventing the production of the desired product by continuous process.

One object of the invention is to provide a process for manufacturing bismuth magnesium aluminosilicate which overcomes the above drawbacks of the prior method.

Another object of the invention is to provide a process for manufacturing bismuth magnesium aluminosilicate in which bismuth magnesium aluminosilicate can be manufactured economically in a continuous manner without using organic solvent.

Further object of the invention is to provide a useful bismuth magnesium aluminosilicate which has stronger anti-pepsin action besides excellent acid consuming capacity as compared with the conventional magnesium aluminosilicate and is capable of thoroughly coating the ulcerous or inflammatory surface of stomach walls and cure it.

According to the invention, the process for manufacturing bismuth magnesium aluminosilicate comprises adding with stirring at 5–60° C., an acidic solution of a bismuth salt dissolved in an inorganic acid of less than pH 2 to an alkaline aqueous slurry of magnesium aluminate of pH 8–12 in such a ratio that the mixture retains alkalinity, and the molar ratio of $Al_2O_3:Bi_2O_3$ is in the range of 1:0.03–1:0.1, further adding with stirring at 5–60° C. to the resultant aqueous slurry an aqueous solution of a silicate in a molar ratio of $Al_2O_3:SiO_2$ between 1:0.3 and 1:3, and finally separating the resultant bismuth magnesium aluminosilicate from the mother liquid.

The bismuth magnesium aluminosilicate of the invention not only has excellent and lasting acid neutralizing capacity but also exhibits strong anti-pepsin action and protects the walls of human stomach, preventing and curing the ulcer and inflammation of stomach walls. The bismuth magnesium aluminosilicate of the invention has the following approximate structure:

$aBi_2O_3 \cdot bMgO \cdot cAl_2O_3 \cdot dSiO_2 \cdot eH_2O$ wherein $a$–$e$ are positive numbers, $a$ being 1, $b$ 10–30, $c$ 10–30, $d$ 10–30 and $e$ 70–150. The particularly desirable compound is in the range of $a:b:c:d$ in a ratio of 1:20–26:10–15:10–15.

The bismuth salts used in the invention include bismuth salts of various inorganic acids, representative of which being bismuth chloride, bismuth nitrate, etc. The representative inorganic acids used for dissolving said bismuth salts are nitric acid, hydrochloric acid, etc. These inorganic acids are far more economical than the organic solvents used in the publicly known method as mentioned before, thus affording the economical method of the invention. It is essential that the acidic aqueous solution consisting of bismuth salt dissolved in inorganic acid has pH of less than 2, preferably less than 1, whereby the undesirable hydrolysis of bismuth salt is prevented. The concentration of bismuth salt in the acidic aqueous solution can vary in a wide range, but desirable is generally 30–60 wt. percent.

The starting material, alkaline aqueous slurry of magnesium aluminate can be produced by various methods, the desirable method being as follows.

One of the methods is to obtain alkaline aqueous slurry of magnesium aluminate by first adding caustic soda to aqueous solution of aluminium salt to make sodium aluminate to which further adding an aqueous soltuion of magnesium salt. In this case, caustic soda may be added to the mixture of the aqueous solution of aluminium salt and aqueous solution of magnesium salt to obtain the same alkaline aqueous slurry.

Another method for producing alkaline aqueous slurry containing magnesium aluminate was accomplished by the present inventor and filed on June 10, 1966 as Japanese patent application No. 37,671/1966. In this process, to aqueous solution of aluminium salt is added aqueous dispersion of basic magnesium compound, and is further added ammonia water to produce alkaline aqueous slurry of magnesium aluminate.

The aluminum salts used in these processes are various water-soluble salts, such as aluminum sulfate, aluminium chloride, aluminium nitrate, etc. The magnesium salts are various water-soluble salts such as magnesium sulfate, magnesium chloride, magnesium nitrate, etc. The basic magnesium compounds as used in the latter process include magnesium hydroxide, basic magnesium carbonate, etc., as well as magnesium oxide, magnesium carbonate, etc. which produce a basic compound in the water. The amount of the magnesium salt or basic magnesium compound relative to the aluminium salt is in the range of molar ratio of 1:0.3–1:3.0 ($Al_2O_3:MgO$)

generally. The amount of caustic soda or ammonia water is such that the resultant slurry of magnesium aluminate has pH of 8–12, preferably 9–11. In any of the above processes, the reaction system is stirred at 5–60° C. under atmospheric or increased pressure throughout the total reaction period. The magnesium aluminate produced by any of the above reactions is considered to be a coprecipitate of aluminium hydroxide and magnesium hydroxide.

According to the invention, the acidic solution of bismuth salt is added to said alkaline aqueous slurry of magnesium aluminate, whereby bismuth is introduced into magnesium aluminate, to produce bismuth magnesium aluminate. The amount of bismuth salt to be used is in the range of molar ratio of 1:0.03–1:0.1 ($Al_2O_3:Bi_2O_3$), preferably 1:0.06–1:0.1. The amount of said acidic solution to be added should be such that the pH of the mixture constantly retains alkalinity, preferably the pH value of 8–10.5 by consideration of the pH of the acidic solution and of the slurry of magnesium aluminate, whereby the bismuth salt is effectively reacted with magnesium aluminate to produce bismuth magnesium aluminate without hydrolysis of the bismuth salt. When the mixed solution turns neutral or acidic, bismuth salt is hydrolyzed, against the object of the invention. In one preferable manner to perform the invention, the acidic solution of bismuth salt is dropwise added to the alkaline slurry of magnesium aluminate with stirring. The reaction is carried out at 5–60° C., preferably at room temperature under atmospheric temperature. Increased pressure may be applied but usually is not necessary. The reaction is generally completed in 5–30 min.

To the produced slurry aqueous solution of silicate is added to produce bismuth magnesium aluminosilicate. The silicates used in the invention comprise various water-soluble silicates such as sodium silicate, potassium silicate, sodium metasilicate, potassium metasilicate, etc. The silicate is added to the mixture in an amount of the molar ratio of $Al_2O_3:SiO_2$ between 1:0.3 and 1:3. The reaction is carried out with stirring at 5–60° C., preferably at room temperature under atmospheric or increased pressure for 5–30 min. to complete the process.

Bismuth magnesium aluminosilicate thus produced is separated from the mother liquid. The resultant slurry is generally filtered and dehydrated under reduced pressure or by centrifugal separator, and further dried to produce the desired product. To accelerate drying reduced pressure or heat is applied, but generally it is predried at 40–60° C. and finally dried at 100–110° C.

For fuller understanding of the invention examples are given below.

Example 1

A reactor equipped with stirrer was charged with aqueous solution of 3 kg. of aluminium sulfate dissolved in 15 liter of water to which was added dropwise aqueous suspension of 1 kg. of magnesium carbonate dispersed in 2.5 liter of water with stirring and the stirring was continued until the carbon dioxide gas was generated no more. By the reaction white precipitates of basic aluminium sulfate were produced. 10 min. after the cessation of generation of carbon dioxide gas 2.5 liter of ammonia water of a concentration of 28 wt. percent was added thereto, whereby slurry containing magnesium aluminate of pH 9.3 was produced.

420 g. of bismuth nitrated ($Bi(NO_3)_3 \cdot 5H_2O$) was dissolved in 450 ml. of nitric acid of a concentration of 22 wt. percent. The resultant solution was added dropwise with stirring to the above slurry of magnesium aluminate in about 20 min. and the slurry of pH 8.8 was obtained, to which aqueous solution of 800 g. of sodium silicate dissolved in 2.5 liter of water was added dropwise with stirring in about 15 min. whereby white water-insoluble precipitate of bismuth magnesium aluminosilicate was obtained. The resultant suspension was left for 1 hour and filtered to separate the precipitate, and after washing it with water to remove water-soluble substance, and further dehydration by centrifugal separator it was dried at 40–60° C., and further dried at 100–110° C. for 5 hours, and pulverized into the desired product. Yield of 1.9 kg.

The product thus obtained was placed in platinum crucible and heated at 700° C. for 2 hours, the reduced weight was 27.82%. The following values were obtained by analysis.

| | Percent |
|---|---|
| MgO | 22.77 |
| $Al_2O_3$ | 25.32 |
| $SiO_2$ | 13.94 |
| $Bi_2O_3$ | 10.15 |
| $H_2O$ | 27.82 |

Thus the product was confirmed to be bismuth magnesium aluminosilicate having the formula:

$$Bi_2O_3 \cdot 25MgO \cdot 11Al_2O_3 \cdot 11SiO_2 \cdot 73H_2O$$

By testing according to the provisions of U.S. Pharmacopeia, its acid consuming capacity was 228.8 ml.

According to the method of K. Schaub, the measurements of acid neutralizing capacity by Johnson & Duncan method, disclosed in Quart J. Tharm and Pharmacol 18,251 (1945) and of anti-pepsin action by Batson method were conducted at the same time, and the following results (Table 1) were obtained. The values of the anti-pepsin action of magnesium aluminosilicate prepared in the same manner as Example 1 except that no nitric acid solution of bismuth nitrate was used is also given in Table 1 below. The measurement was conducted as follows:

A 200 ml. beaker was charged with 150 ml. of solution of 0.35 g. of crystal pepsin (1:10,000) dissolved in 1 liter of 0.05 N HCl, and with stirring at constant temperature of 37±0.5° C., 1.0 g. of the compound to be tested was added thereto to prepare the test solution. The pH of the solution to which was added bismuth magnesium aluminosilicate was measured at the intervals as shown in Table 1. For measuring the anti-pepsin action of bismuth magnesium aluminosilicate and magnesium aluminosilicate 20 ml. of the test liquid was taken out in each 10 minutes after the addition of the compound, and 20 ml. of new solution obtained by dissolving 0.35 g. of pepsin crystal (1:10,000) in 1 liter of 0.1 N HCl was supplemented.

Said 20 ml. of the test liquid taken out in each 10 minutes were separated respectively from insoluble substance by centrifugal separator, and the anti-pepsin action was measured of the supernatant liquid thereof.

TABLE 1

| Measuring intervals (min.) | Bismuth magnesium aluminosilicate | | Magnesium aluminosilicate |
|---|---|---|---|
| | pH | Pepsin percent | Pepsin percent |
| 1 | 4.02 | | |
| 3 | 4.08 | | |
| 5 | 4.11 | | |
| 10 | 4.27 | 4.0 | 8.0 |
| 20 | 4.02 | 2.0 | 14.0 |
| 30 | 3.94 | 3.0 | 18.0 |
| 40 | 3.82 | 2.0 | 25.0 |
| 50 | 3.64 | 3.0 | 45.0 |
| 60 | 3.43 | 28.0 | 60.0 |

Each sample compounds was orally administered to rats at the rate of 20 mg./kg., and immediately the rat's pylorus was tied up and after 24 hrs. the stomach was cut open, and observed for the creation of ulcer. The results were tabulated in Table 2 below:

TABLE 2

Bismuth magnesium aluminosilicate—Almost no changes observed.

Magnesium aluminosilicate—No ulcer was observed but bleeding inflammation observed.

Control—Ulcers were observed at 4–7 locations.

Example 2

A reactor with stirrer was charged with 3 kg. of aluminium sulfate dissolved in 30 liters of water, to which was added 2.1 kg. of aluminium sulfate dissolved in 30 liter of water, to which was added 2.1 kg. of NaOH dissolved in 10 liter of water, to produce sodium aluminate.

2.1 kg. of magnesium chloride dissolved in 10 liters of water was added dropwise thereto with stirring in 30 min. to produce aqueous slurry (pH 11.3) of magnesium aluminate. Then 400 g. of bismuth nitrate $(Bi(NO_3)_3 \cdot 5H_2O)$, dissolved in 450 ml. of nitric acid of a concentration of 22 wt. percent was added dropwise in 10 min. with stirring to the above slurry to produce white precipitates of bismuth magnesium aluminate, to which was further added with violent stirring 800 g. of sodium silicate dissolved in 1 liter of water to produce white water-insoluble precipitates of bismuth magnesium aluminosilicate.

The resultant slurry of bismuth magnesium aluminosilicate was filtered, and water-soluble substance was removed by washing with water, and after dehydration it was dried at 40–60° C., further dried at 100–110° C. and pulverized whereby the desired product was obtained. Yield: 1.7 kg.

Analysis of the product heat-treated with the same method as in Example 1 gave the following results:

| | Percent |
|---|---|
| MgO | 20.18 |
| $Al_2O_3$ | 27.29 |
| $SiO_2$ | 16.30 |
| $Bi_2O_3$ | 9.19 |
| $H_2O$ | 29.04 |

Thus the product was confirmed to be bismuth magnesium aluminosilicate of the formula:

$$Bi_2O_3 \cdot 25MgO \cdot 14Al_2O_3 \cdot 14SiO_2 \cdot 73H_2O$$

Acid consuming capacity of the product measured by the same method as in Example 1 was 230.5 ml.

According to the method of K. Schaub described in Example 1 the following results were obtained.

TABLE 3

| Measuring interval (min.) | Bismuth magnesium aluminosilicate | |
|---|---|---|
| | pH | Pepsin percent |
| 1 | 4.20 | |
| 3 | 4.28 | |
| 5 | 4.31 | |
| 10 | 4.33 | 3.0 |
| 20 | 4.21 | 2.0 |
| 30 | 4.03 | 2.0 |
| 40 | 3.87 | 2.0 |
| 50 | 3.72 | 2.0 |
| 60 | 3.52 | 22.0 |

Example 3

A reactor with stirrer was charged with 3 kg. of aluminium-sulfate dissolved in 20 liter of water and 2.5 kg. of magnesium sulfate dissolved in 10 liter of water to prepare a mixed aqueous solution of aluminium sulfate and magnesium sulfate. To the solution was added 2.1 kg. of caustic soda (NaOH), dissolved in 5 liter of water, to produce white precipitates of magnesium aluminate, whose pH being 10.5. Then to the suspension was added in 15 min. with stirring 400 g. of bismuth nitrate $$(Bi(NO_3)_3 \cdot 5H_2O)$$

dissolved in 150 ml. of nitric acid of a concentration of 22 weight percent, at which stage pH was 9.0. To this was added with violent stirring 805 g. of sodium silicate, dissolved in 1 liter of water to produce white and water-insoluble precipitates of bismuth magnesium aluminosilicate.

The suspension of magnesium bismuth aluminosilicate thus obtained was filtered, washed with water to remove water-soluble substances, dehydrated and dried at 40–60° C. and further dried at 100–110° C. for 5 hours and pulverized into desired product. Yield: 1.75 kg.

Analysis of the product heat-treated with the same method as in Example 1 gave the following results:

| | Percent |
|---|---|
| MgO | 18.55 |
| $Al_2O_3$ | 22.52 |
| $SiO_2$ | 13.26 |
| $Bi_2O_3$ | 9.33 |
| $H_2O$ | 36.34 |

Thus the product was confirmed to be bismuth magnesium aluminosilicate of the formula:

$$Bi_2O_3 \cdot 23MgO \cdot 11Al_2O_3 \cdot 11SiO_2 \cdot 109H_2O$$

Acid consuming capacity of the product measured by the same manner as in Example 1 was 218.3 ml.

According to the method of K. Schaub described in Example 1 the following results were obtained.

TABLE 4

| Measuring interval (min.) | Bismuth magnesium aluminosilicate | |
|---|---|---|
| | pH | Pepsin (percent) |
| 1 | 3.89 | |
| 3 | 4.05 | |
| 5 | 4.13 | |
| 10 | 4.22 | 5.0 |
| 20 | 4.11 | 4.0 |
| 30 | 3.79 | 4.0 |
| 40 | 3.83 | 3.0 |
| 50 | 3.66 | 8.0 |
| 60 | 3.50 | 34.0 |

What we claim is:

1. A process for manufacturing bismuth magnesium aluminosilicate comprising adding with stirring at 5–60° C. an acidic solution of a bismuth salt dissolved in an inorganic acid of less than pH 2 to an alkaline aqueous slurry of a magnesium aluminate of pH 8–12 in such a ratio that the mixture retains a pH 8–10.5 and molar ratio of $Al_2O_3:Bi_2O_3$ is in the range of 1:0.03–1:0.1, further adding with stirring at 5–60° C. to the resultant aqueous slurry an aqueous solution of a silicate in a molar ratio of $Al_2O_3:SiO_2$ between 1:0.3 and 1:3, and separating the resultant bismuth magnesium aluminosilicate from the mother liquid.

2. The process for manufacturing bismuth magnesium aluminosilicate according to claim 1, in which said bismuth salt is selected from the group consisting of bismuth chloride and bismuth nitrate.

3. The process for manufacturing bismuth magnesium aluminosilicate according to claim 1, in which said inorganic acid is selected from the group consisting of nitric acid and hydrochloric acid.

4. The process for manufacturing bismuth magnesium aluminosilicate according to claim 1, in which said acidic solution of a bismuth salt is a solution of bismuth nitrate dissolved in nitric acid.

5. The process for manufacturing bismuth magnesium aluminosilicate according to claim 1, in which said molar ratio of $Al_2O_3:Bi_2O_3$ between 1:0.06 and 1:0.1.

6. The process for manufacturing bismuth magnesium aluminosilicate according to claim 1, in which said alkaline aqueous slurry of magnesium aluminate is prepared by adding with stirring at 5–60° C. caustic soda to an aqueous solution of an aluminium salt, and further adding with stirring at 5–60° C. to the resultant slurry an aqueous solution of a magnesium salt.

7. The process for manufacturing bismuth magnesium aluminosilicate according to claim 1, in which said alkaline aqueous slurry of magnesium aluminate is prepared by adding with stirring at 5–60° C. caustic soda to an aqueous mixture of an aluminum salt and a magnesium salt.

8. The process for manufacturing bismuth magnesium aluminosilicate according to claim 1, in which said alkaline aqueous slurry of magnesium aluminate is prepared by adding with stirring at 5–60° C. an aqueous slurry of a basic magnesium compound to an aqueous solution of an aluminum salt and further adding with stirring at 5–60° C. ammonia water to the resultant slurry.

References Cited

UNITED STATES PATENTS 2,623,020   12/1952   Gilbert   23—52
2,923,660   2/1960   Hallman   23—52

FOREIGN PATENTS 14,704   8/1963   Japan.
1,159,916   12/1963   Germany.
1,357,609   3/1964   France.

OSCAR R. VERTIZ, Primary Examiner

H. S. MILLER, Assistant Examiner

U.S. Cl. X.R.

23—52, 113; 424—154